(12) United States Patent
Wang

(10) Patent No.: US 7,399,517 B2
(45) Date of Patent: Jul. 15, 2008

(54) CUSHION PAD FOR SHOES

(75) Inventor: Jack Wang, Taichung (TW)

(73) Assignee: I Shing Trade Co., Ltd., Taichung (TW)

( * ) Notice: Subject to any disclaimer, the term of this patent is extended or adjusted under 35 U.S.C. 154(b) by 500 days.

(21) Appl. No.: 11/108,775

(22) Filed: Apr. 19, 2005

(65) Prior Publication Data

US 2006/0234012 A1    Oct. 19, 2006

(51) Int. Cl.
- *B32B 1/00* (2006.01)
- *F16F 7/00* (2006.01)
- *A43B 13/20* (2006.01)
- *A43B 21/26* (2006.01)

(52) U.S. Cl. .............. 428/178; 428/120; 428/188; 267/163; 267/141; 248/562; 248/611; 248/633; 36/28; 36/35 R; 5/654

(58) Field of Classification Search ............... 428/119, 428/120, 178, 188, 116; 36/28, 29, 35 R, 36/44; 248/562, 64, 633; 5/654, 654.1; 267/136, 267/140.3, 141, 144
See application file for complete search history.

(56) References Cited

U.S. PATENT DOCUMENTS

| | | | |
|---|---|---|---|
| 3,462,330 A * | 8/1969 | Greig et al. ............... 156/210 |
| 6,284,346 B1 * | 9/2001 | Sheridan ................... 428/156 |
| 6,939,599 B2 * | 9/2005 | Clark ........................ 428/178 |
| 2004/0005438 A1 * | 1/2004 | Lichodziejewski et al. .. 428/166 |

* cited by examiner

*Primary Examiner*—Donald Loney
(74) *Attorney, Agent, or Firm*—Rosenberg, Klein & Lee

(57) ABSTRACT

A cushion pad for shows includes a top plate, a bottom plate and a flexible mediate portion connected between the top plate and the bottom plate. The flexible mediate portion includes a plurality of straight plates perpendicularly connected to the top plate and the bottom plate, and a serrated plate is connected between the straight plates extending from the top plate and the bottom plate.

5 Claims, 5 Drawing Sheets

CUSHION PAD FOR SHOES

FIELD OF THE INVENTION

The present invention relates to a cushion pad for shoes and includes a top plate, a bottom plate and a flexible mediate portion connected between the top plate and the bottom plate.

BACKGROUND OF THE INVENTION

One of the conventional cushion members for shoes is a bladder which is inserted in the shoe sole and air in the bladder is compressible so as to absorb shocks and the weight of the wearer. Nevertheless, the bladder is not air-permeable so that the foot in the shoe is suffered by sweater and heat. Besides, once the bladder is broken, the function is completely gone and the bladder cannot be replaced so that the wearer has to discard the shoes. The bladders require special equipment to manufacture and this means a high manufacturing cost is involved.

The present invention intends to provide a cushion pad that is easily to be manufactured and includes a plurality of flexible members clamped between a top plate and a bottom plate. The sizes, shapes and arrangements of the flexible members can be varied according to needs.

SUMMARY OF THE INVENTION

The present invention relates to a cushion pad that comprises a top plate, a bottom plate and a flexible mediate portion connected between the top plate and the bottom plate. The top plate, the bottom plate and the flexible mediate portion are made as a one piece by way of plastic injection which is easily to be manufactured.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
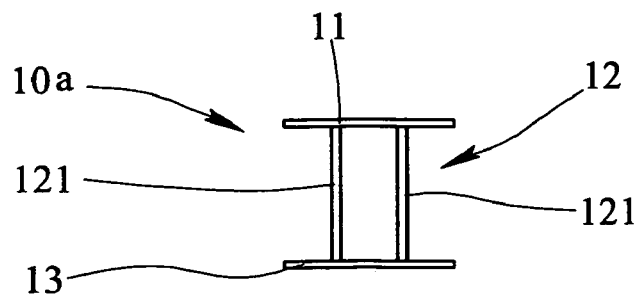
FIG. 1 shows a first embodiment of the cushion pad of the present invention.
Figure 2:
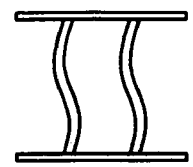
FIG. 2 shows that the straight plates of the flexible mediate portion in FIG. 1 are deformed.

Referring to FIGS. 1 and 2, a first embodiment of the cushion pad 10a of the present invention includes a top plate 11, a bottom plate 13 and a flexible mediate portion 12 which is integrally connected between the top plate 11 and the bottom plate 13 by way of plastic injection. The flexible mediate portion 12 includes straight plates 121 connected between the top plate 11 and the bottom plate 13, so that when the flexible mediate portion 12 is applied by a load, the straight plates 121 are deformed to absorb the load.

Figure 3:
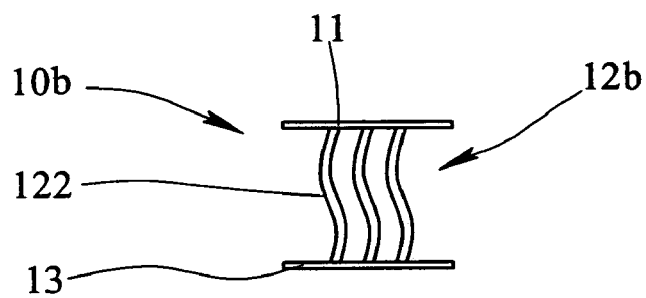
FIG. 3 shows a second embodiment of the cushion pad of the present invention.
Figure 4:
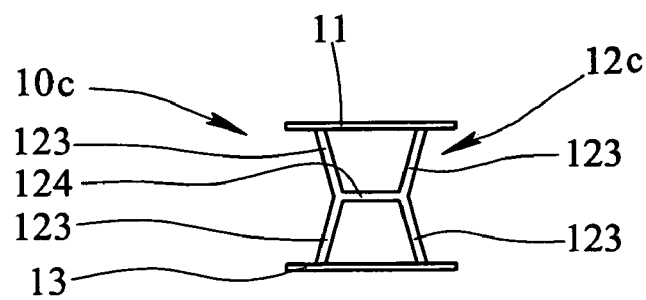
FIG. 4 shows a third embodiment of the cushion pad of the present invention.
Figure 5:
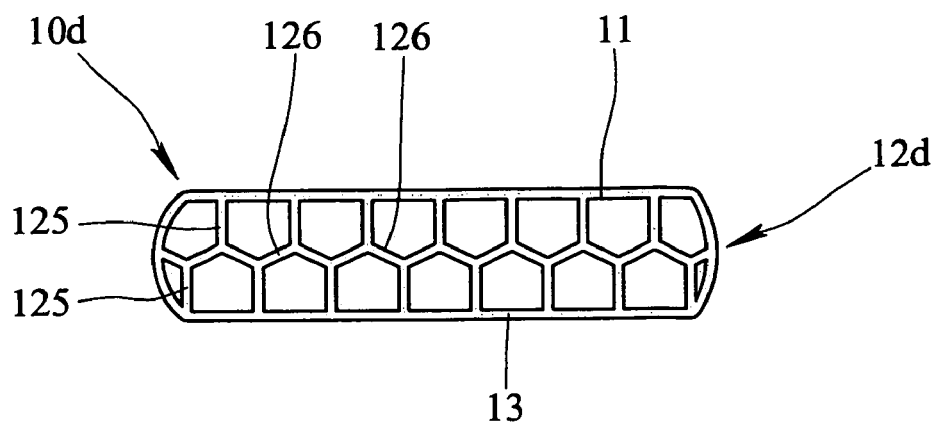
FIG. 5 shows a fourth embodiment of the cushion pad of the present invention.
Figure 6:
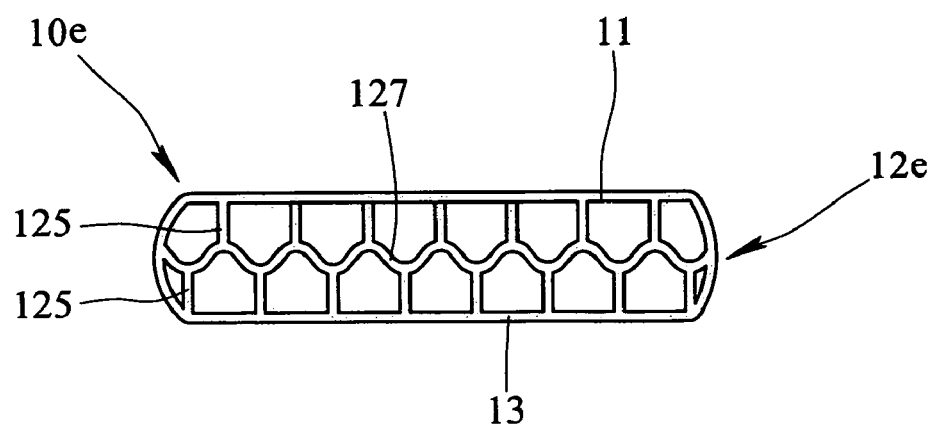
FIG. 6 shows a fifth embodiment of the cushion pad of the present invention.
Figure 7:
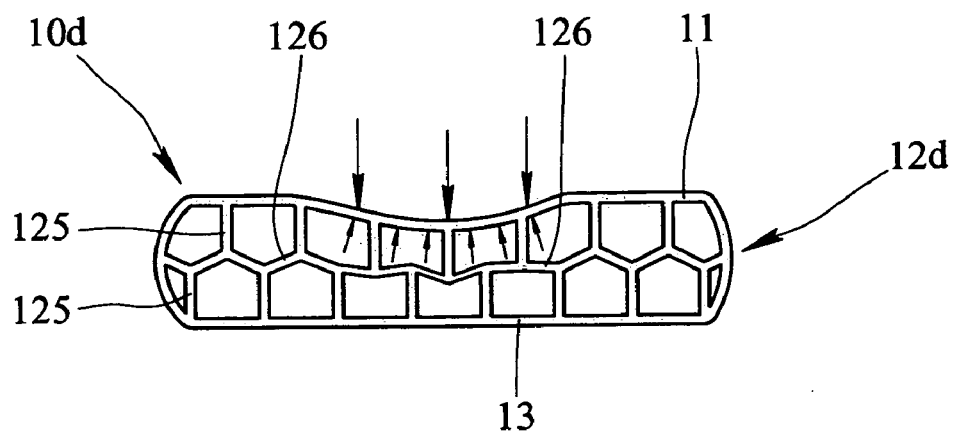
FIG. 7 shows that the fourth embodiment of the cushion, pad is compressed from the top thereof.

FIG. 3 shows a second embodiment of the cushion pad 10b of the present invention and the flexible mediate portion 12b includes curve plates 122 connected between the top plate 11 and the bottom plate 13. FIG. 4 shows a third embodiment of the cushion pad 10c of the present invention and the flexible mediate portion 12c includes a plurality of H-shaped members. Each H-shaped member includes straight plates 123 respectively and inclinedly connected to the top plate 11 and the bottom plate 13 and a horizontal plate 124 is connected between the straight plates 123 extending from the top plate 11 and the bottom plate 13. Two sides of each of the H-shaped members are bent inward at a middle portion thereof and the horizontal plate 124 is connected between the two bent middle portions of the two sides of each H-shaped member.

Referring to FIGS. 5, 7, 9 and 11, the flexible mediate portion 12d of the fourth embodiment of the cushion pad 10d of the present invention includes a plurality of straight plates 125 perpendicularly connected to the top plate 11 and the bottom plate 13. A serrated plate 126 is connected between the straight plates 125 extending from the top plate 11 and the bottom plate 13 so as to define a plurality of chambers. A gap between the straight plates 125 is 1 mm to 3 mm. When a load is applied to a top of the cushion pad 10d, the top plate 11, the straight plates 125 on the top plate 11 and the serrated plate 126 are deformed so absorb the load. The air in the chambers is compressible and supports the load.

Figure 8:
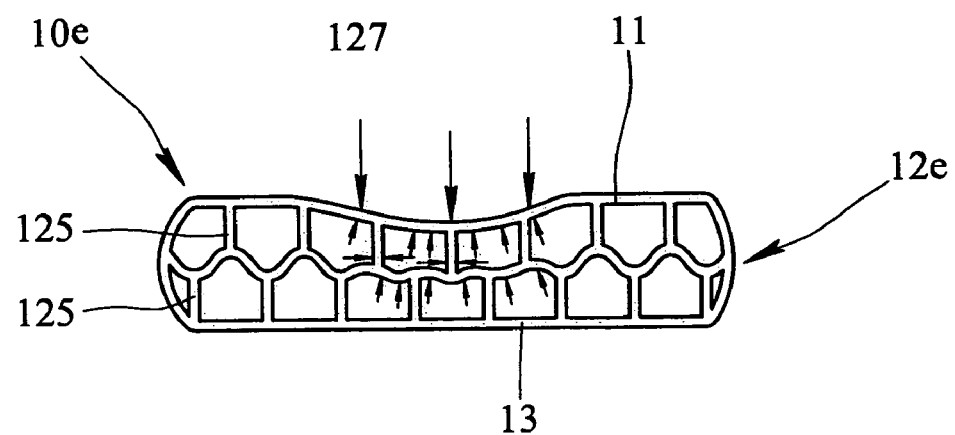
FIG. 8 shows that the fifth embodiment of the cushion pad is compressed from the top thereof.
Figure 9:
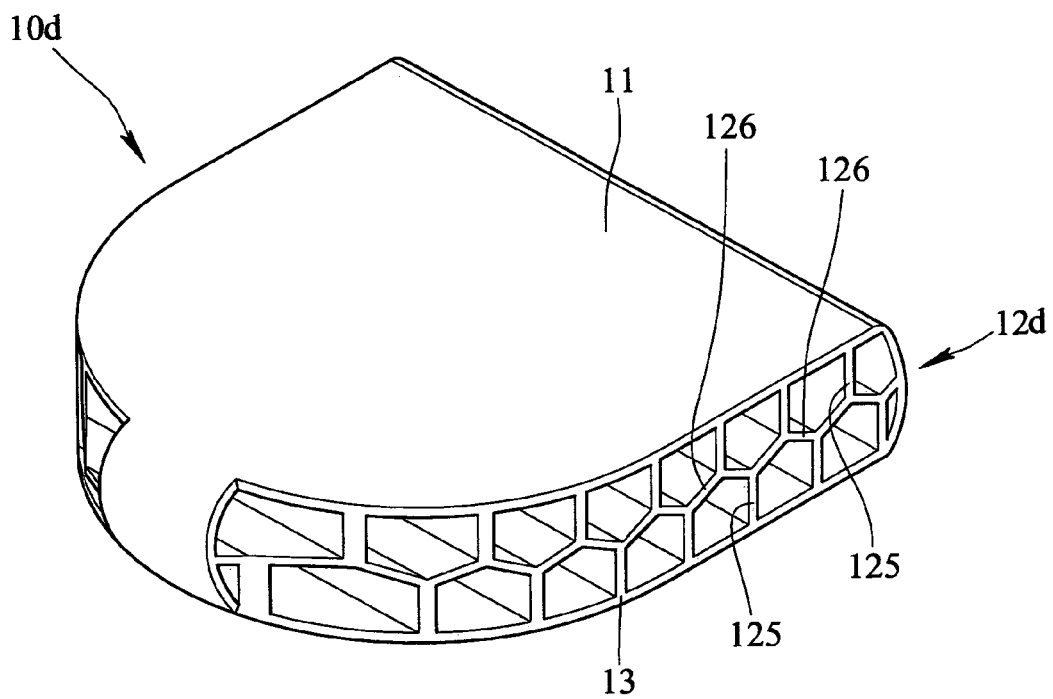
FIG. 9 is a perspective view of the fourth embodiment of the cushion pad of the present invention.
Figure 10:
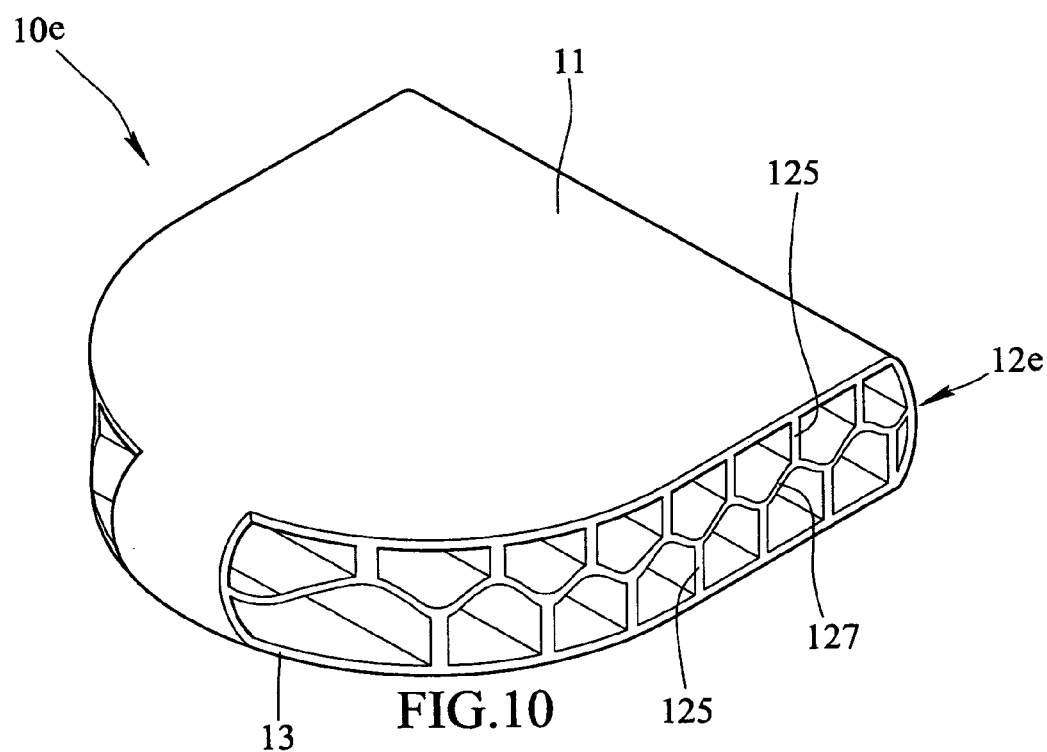
FIG. 10 is a perspective view of the fifth embodiment of the cushion pad of the present invention.
Figure 11:
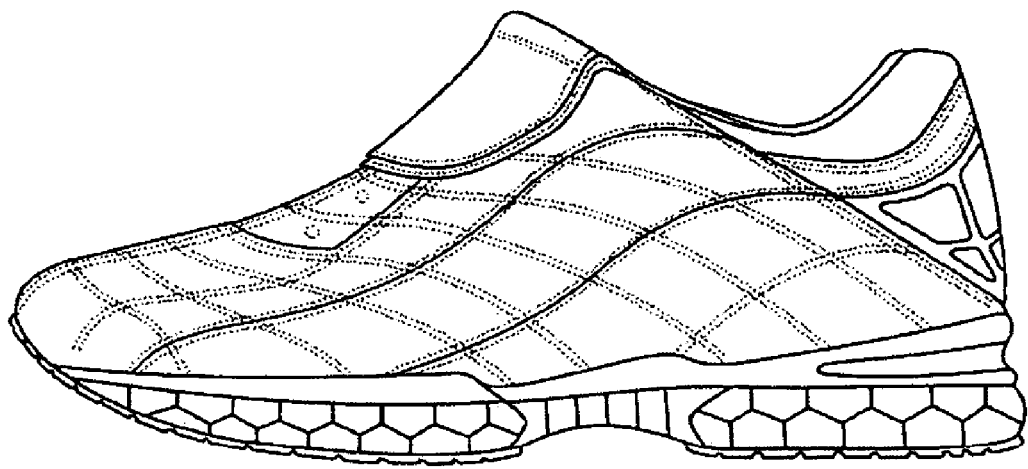
FIG. 11 is a side view of the cushion pad in a sport shoe.

Referring to FIGS. 8 and 10, the flexible mediate portion 12e of the fifth embodiment of the cushion pad 10e of the present invention includes a plurality of straight plates 125 perpendicularly connected to the top plate 11 and the bottom plate 13, a wave-shaped plate 126 is connected between the straight plates 125 extending from the top plate 11 and the bottom plate 13. A gap between the straight plates 125 is 1 mm to 3 mm.

The thickness of the flexible mediate portion is in a range of 1 mm to 3 mm and a height of the flexible mediate portion is in a range of 5 mm to 25 mm. A thickness of the top plate is 1 mm to 3 mm and a thickness of the bottom plate is 1 mm to 3 mm.

It is noted that the flexible mediate portion can also be composed of several sections which have different heights. The gaps between the straight plates 125 can be varied according to needs.

While we have shown and described the embodiment in accordance with the present invention, it should be clear to those skilled in the art that further embodiments may be made without departing from the scope of the present invention.

What is claimed is:

1. A cushion pad comprising: a top plate; a bottom plate, a flexible mediate portion integrally connected between the top plate and the bottom plate, the flexible mediate portion includes a plurality of vertically directed straight plates connected to the top plate and the bottom plate, a serrated plate is connected between opposing straight plates extending from the top plate and the bottom plate, the plurality of straight plates and the serrated plate form an upper and lower level of substantially pentagon-shaped members, whereby one of the upper level of pentagon-shaped members is disposed above and in the center of two lower level pentagon-shaped members in order to provide increased support and durability of the cushion pad.

2. The cushion pad as claimed in claim 1, wherein a thickness of the flexible mediate portion is in a range of 1 mm to 3 mm.

3. The cushion pad as claimed in claim 1, wherein a height of the flexible mediate portion is in a range of 5 mm to 25 mm.

4. The cushion pad as claimed in claim 1, wherein a thickness of the top plate is 1 mm to 3 mm.

5. The cushion pad as claimed in claim 1, wherein a thickness of the bottom plate is 1 mm to 3 mm.

* * * * *